(12) United States Patent
Hatjasalo et al.

(10) Patent No.: US 7,307,786 B2
(45) Date of Patent: Dec. 11, 2007

(54) BEAM SHAPER

(75) Inventors: Leo Hatjasalo, Helsinki (FI); Kari Rinko, Helsinki (FI)

(73) Assignee: Oy Modines Ltd, Helsinki (FI)

( * ) Notice: Subject to any disclaimer, the term of this patent is extended or adjusted under 35 U.S.C. 154(b) by 275 days.

(21) Appl. No.: 10/450,393

(22) PCT Filed: Dec. 11, 2001

(86) PCT No.: PCT/FI01/01082

§ 371 (c)(1),
(2), (4) Date: Oct. 7, 2003

(87) PCT Pub. No.: WO02/48758

PCT Pub. Date: Jun. 20, 2002

(65) Prior Publication Data

US 2004/0057114 A1    Mar. 25, 2004

(30) Foreign Application Priority Data

Dec. 13, 2000    (FI) ................................. 20002737

(51) Int. Cl.
*G02B 5/18*    (2006.01)
(52) U.S. Cl. ...................... 359/569; 359/741; 362/800; 257/98; 257/100
(58) Field of Classification Search .................. None
See application file for complete search history.

(56) References Cited

U.S. PATENT DOCUMENTS

| | | | |
|---|---|---|---|
| 3,670,260 A | 6/1972 | Koester et al. | |
| 4,337,994 A * | 7/1982 | Brasier | 359/18 |
| 4,410,237 A | 10/1983 | Veldkamp | |
| 5,038,354 A * | 8/1991 | Yagi | 372/44.01 |
| 5,115,423 A * | 5/1992 | Maeda et al. | 369/44.23 |
| 5,130,531 A * | 7/1992 | Ito et al. | 250/216 |
| 5,296,724 A * | 3/1994 | Ogata et al. | 257/98 |
| 5,496,616 A | 3/1996 | Harris | |
| 5,930,219 A * | 7/1999 | Kim | 369/112.02 |

(Continued)

FOREIGN PATENT DOCUMENTS

RU    1829826    2/1996

(Continued)

OTHER PUBLICATIONS

Search report issued in priority application EP270792.3.

(Continued)

*Primary Examiner*—Arnel Lavarias
(74) *Attorney, Agent, or Firm*—Venable LLP; Eric J. Franklin

(57) ABSTRACT

A beam shaper intended for use in connection with a quasi-monochromatic light source and which is fabricated from a substantially transparent material as a transmission element guiding the propagation of light for rounding, making elliptical, collimating, diverging, converging and/or for the like application of a light beam/beams. The beam shaper has its transmission element guiding the light beam/beams provided with a structure which at least partially consists of binary, surface relief type of diffractive patterns, having local granting periods thereof optimized with respect to longitudinal and transverse directions, as well as with respect to an optical axis, essentially in accordance with the Bragg diffraction geaometry for providing a maximum diffraction efficiency.

17 Claims, 8 Drawing Sheets

U.S. PATENT DOCUMENTS

Figure 1:
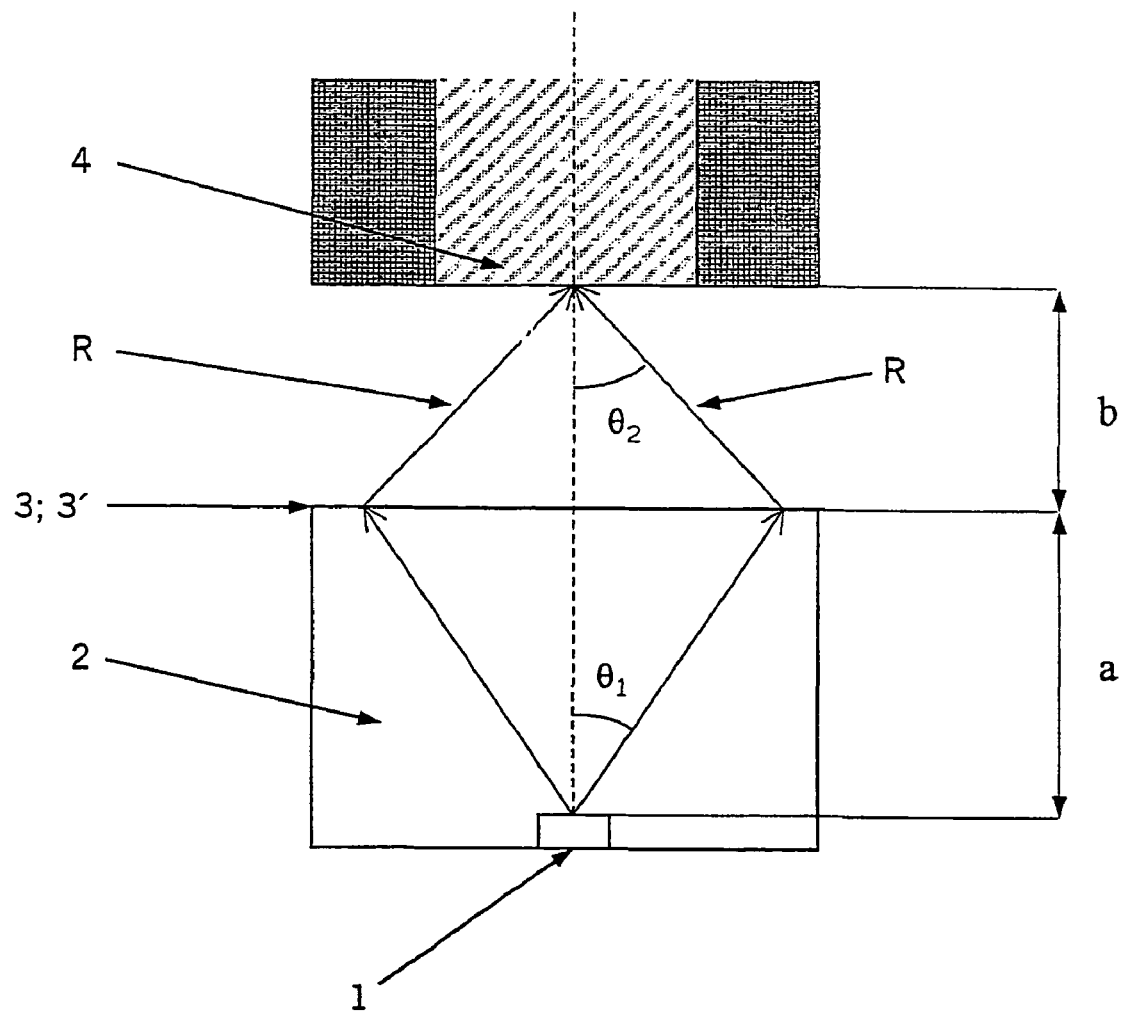

| | | |
|---|---|---|
| 5,982,806 A | 11/1999 | Yamaguchi et al. |
| 5,986,807 A | 11/1999 | Fork |
| 6,075,650 A | 6/2000 | Morris et al. |
| 6,157,756 A | 12/2000 | Ishiwata |
| 6,835,963 B2 * | 12/2004 | Hatakoshi et al. ............ 257/98 |
| 6,987,613 B2 * | 1/2006 | Pocius et al. ............... 359/565 |

FOREIGN PATENT DOCUMENTS

| | | |
|---|---|---|
| SU | 1748127 | 7/1992 |
| WO | WO-99/10765 A | 3/1999 |
| WO | WO 99/39410 A1 | 8/1999 |

OTHER PUBLICATIONS

Search report issued in priority application EP01958103.2.
Jari Turunen, Paul Blair, J. Michael Miller, Mohammad R. Taghizadeh and Eero Noponen; Bragg holograms with binary synthetic surface-relief profile; Optizs Letters; Jun. 15, 1993; pp. 1022-1024; vol. 18; No. 12; New York, NY.

* cited by examiner

BEAM SHAPER

CROSS-REFERENCE TO RELATED APPLICATIONS

This application claims priority to Finnish patent application 20002737 filed 13 Dec. 2000 and is the national phase of PCT/FI01/01082 filed 11 Dec. 2001.

FIELD OF THE INVENTION

The invention relates to a beam shaper, which is intended for use in connection with a quasi-monochromatic light source and which is fabricated from a substantially transparent material as a transmission element guiding the propagation of light for rounding, making elliptical, collimating, diverging, converging and/or for the like application of a light beam/beams.

For the above application there are presently known transmission elements e.g. as follows: a) refractive lens systems, b) diffractive lens systems, and c) hybrid assemblies.

In addition to the foregoing, use is currently made also of a so-called Bragg reflector, the assembly used in this context being partially reflective and partially transparent. It is further known to employ the Bragg construction in optical fiber applications as a so-called fiber grating, which functions as a selective output assembly, but not, however, as an actual lens-like transmission element. However, the solutions described in this context have yet to find a practical utilization in beam shaping today.

BACKGROUND OF THE INVENTION

Thus, especially U.S. Pat. No. 5,966,399 discloses a Bragg reflector or a so-called Fresnel lens, integrated in communication with a vertical cavity laser (VCSEL), which does not, however, constitute an actual protection matrix for a semiconductor. In this context, however, no solutions have been described which would be directly applicable to mass production. Furthermore, International patent application PCT/US98/17295 describes a beam shaper integrated in semiconductor lasers and comprising a separate lens element. This particular lens is based on traditional refractive and diffractive arrangements, and hybrid assemblies constructed therefrom. However, the lens element described in the cited reference does not constitute a component integral with a light source, nor is there any reference in this instance even to exploitation of the Bragg effect. In addition, U.S. Pat. No. 6,075,650 discloses a beam shaper, comprising a separate cylindrical lens which is also based on refractive or diffractive surfaces, having been modified for shaping a light wave front produced principally by laser diodes. On the one hand, this reference does not describe any solutions either that would be in any way integral with a light source, nor, on the other hand, any utilization of the Bragg grating.

SUMMARY OF THE INVENTION

It is an object for a beam shaper of the invention to provide a decisive improvement regarding the above-described technology and, hence, to raise essentially the technical level of prior art. In order to fulfill this object, a beam shaper of the invention is principally characterized in that its transmission element guiding the light beam/beams has a structure which at least partially consists of binary, surface relief type of diffractive patterns, having local grating periods thereof optimized with respect to longitudinal and transverse directions, as well as with respect to an optical axis, essentially in accordance with the Bragg diffraction geometry for providing a maximum diffraction efficiency.

The most important benefits offered by a beam shaper of the invention include its ideal structure, both in theoretical sense and also in practical applications, whereby particularly the beam shaper integrated as a peripheral component for a light source is capable of providing a maximum theoretical efficiency, especially when the Bragg effect is exploited in the process of modeling lens-like transmission element assemblies. In addition, the integral nature of a beam shaper of the invention enables an extremely effective mass production, as well as optical systems which, from a practical viewpoint, are as simple, effective and durable as possible. By virtue of the invention, it is also possible to improve e.g. beams, which are emitted by LEDs and edge-emitting semiconductor lasers and diverged across a wide range of incidence angles and which are difficult to collimate or image with a sufficiently high efficiency by using traditional optical elements.

BRIEF DESCRIPTIONS OF THE DRAWINGS

In the following specification, the invention will be described in detail with reference to the accompanying drawings, wherein FIGS. 1-5 illustrate views associated principally with a specification regarding the application of the Bragg effect, and FIGS. 6-12 illustrate various preferred optional implementations for a beam shaper of the invention.

DETAILED DESCRIPTION OF EMBODIMENTS OF THE INVENTION

The invention relates to a beam shaper, which is intended for use in connection with a quasi-monochromatic light source 1 and which is fabricated from a substantially transparent material as a transmission element 3 guiding the propagation of light for rounding, making elliptical, collimating, diverging, converging and/or for the like application of a light beam/beams R. The transmission element 3; 3' of a beam shaper guiding the light beam/beams R has a structure which at least partially consists of binary, surface relief type of diffractive patterns, having local grating periods thereof optimized with respect to longitudinal and transverse directions, as well as with respect to an optical axis, essentially in accordance with the Bragg diffraction geometry for providing a maximum diffraction efficiency.

The following description deals with the basic inventive concepts by explaining the Bragg effect with reference to the accompanying FIGS. 1-5. FIG. 1 depicts a purely diffractive element on a flat surface, i.e. the imaging geometry of 1:1. The light source 1 comprises e.g. a laser or a LED, which is provided with a matrix 2 having a refractive index of n, a diffractive lens 3, and a multi-mode fiber core 4. In order to fulfill the imaging geometry of 1:1, it is required that $$b = a/n \quad (1)$$

and $$n \tan \theta_1 = \tan \theta_2 \quad (2)$$

The diffractive lens has a local grating period $d(r)$, in which r is a distance from the optical axis and which is determined from a grating equation $$\sin \theta_2 = n \sin \theta_1 - \lambda/d(r), \quad (3)$$

wherein λ represents a wave length. Thus, equation 3 provides a solution to a local period at every location.

It is known, e.g. on the basis of sources: E. Noponen, J. Turunen, and A. Vasara, "*Parametric optimization of multilevel diffractive optical elements by electromagnetic theory*", Applied Optics 31, 5010-5012 (1992) and E. Noponen, J. Turunen, and A. Vasara, "*Electromagnetic theory and design of diffractive-lens arrays*", Journal of the Optical Society of America A 10, 434-443 (1993) that the optimal surface profile of a diffractive focusing or collimating lens is highly dependent on a local period at large incidence angles and that the manufacturing of optimal multilevel profiles for large incidence angles is extremely difficult. In the case of an imaging lens, particularly in the imaging geometry of 1:1, it is nevertheless possible, at large incidence angles, to make use of the Bragg effect, which has been previously used for the binary coding of diffractive elements as disclosed e.g. in sources J. Turunen, P. Blair, J. M. Miller, M. R. Taghizadeh, and E. Noponen, "*Bragg holograms with binary synthetic surface-relief profile*", Optics Letters 18, 1022-1024 (1993), but not in the case of lenses. In the above case, the lens is centrally provided with a normal diffractive pattern, but along its edges with binary Bragg patterns which have been optimized further e.g. in the source E. Noponen and J. Turunen, "*Binary high-frequency-carrier diffractive optical elements: electromagnetic theory*", Journal of the Optical Society of America A 11, 1097-1109 (1994).

Figure 2:
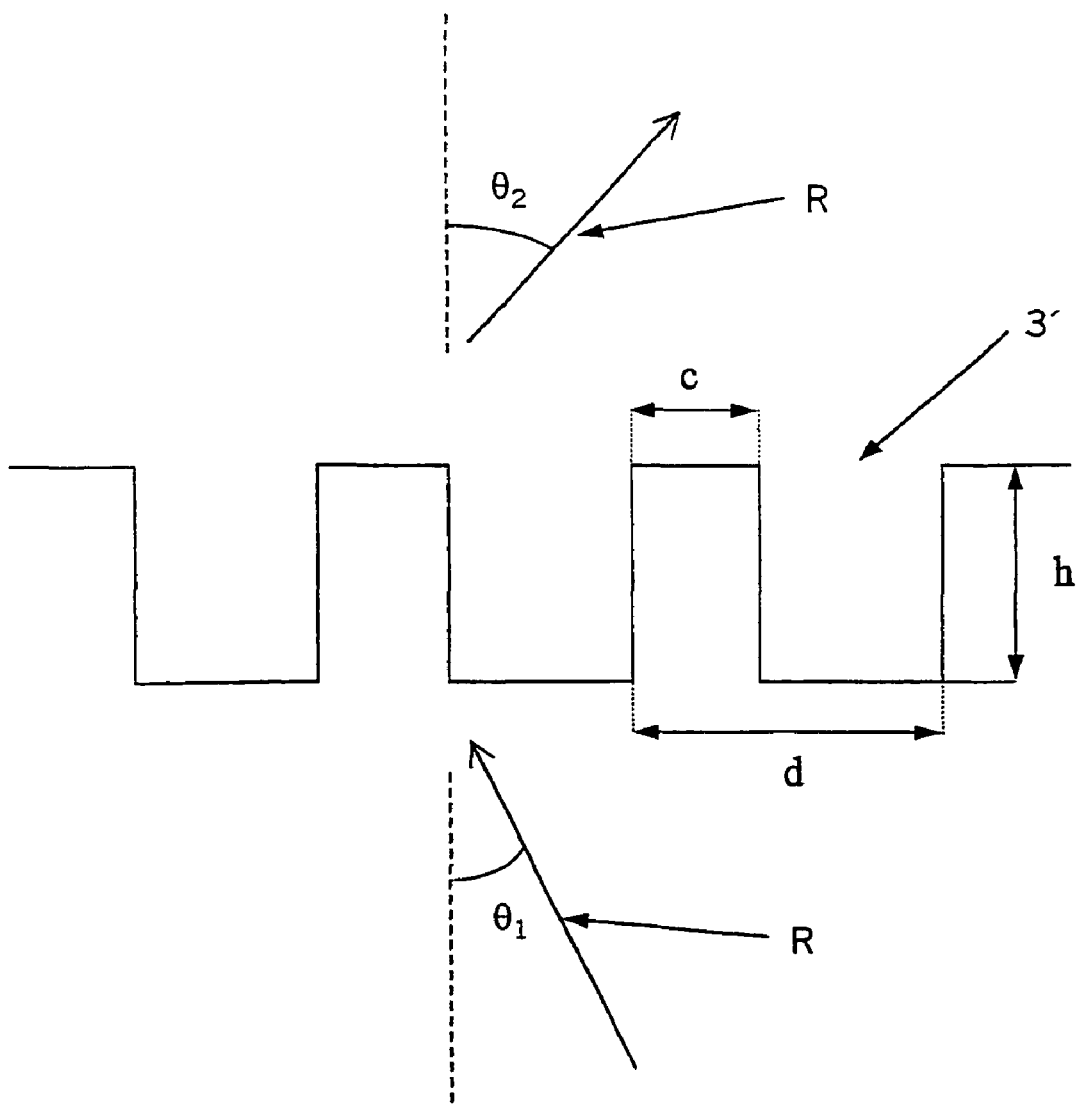

FIG. 2 represents a typical diffractive grating pattern (appearing on the surfaces of FIGS. 1, 3 and 4), which is modified in accordance with the Bragg condition. Angles $\theta_1$ and $\theta_2$ are the same as in FIG. 1, d continues to represent a local grating period, c is the width of a peak and h is its height. If the Bragg conditions $$n \sin \theta_1 = -\sin \theta_2 = \lambda/2d \quad (4)$$

are fulfilled and the local grating period lies between $0.5\lambda < d < 2\lambda$ it is possible to choose parameters c and h so as to obtain an extremely high diffraction efficiency for the grating. Hence, in practice, the Bragg grating can be used, if $\theta_2 > 15°$.

Comparison of the above equations (2) and (4) reveals that the Bragg condition 4 is only approximately satisfied in the geometry of FIG. 1. Approximation is valid when $\sin \theta_1 \approx \tan \theta_1$ and $\sin \theta_2 \approx \tan \theta_2$ (i.e. error occurs particularly at large incidence angles). However, the Bragg condition need not be exactly valid for the grating to function at a high efficiency (see the above source E. Noponen and J. Turunen). In addition, it is possible to deviate slightly from the 1:1 imaging geometry, such that the Bragg condition is optimally satisfied at an incidence angle $\theta_{max}$, across which the intensity distribution reaches its highest values.

Thus, instead of equation (1), the result is $$b = a \frac{(1 - n^2 \sin^2 \theta_{max})^{1/2}}{n \cos \theta_{max}}. \quad (5)$$

As an alternative, $\theta_{max}$ can be replaced with a non-zero incidence angle, which is dependent on the shape of intensity distribution and which is selected in view of maximizing overall diffraction efficiency.

Figure 3:
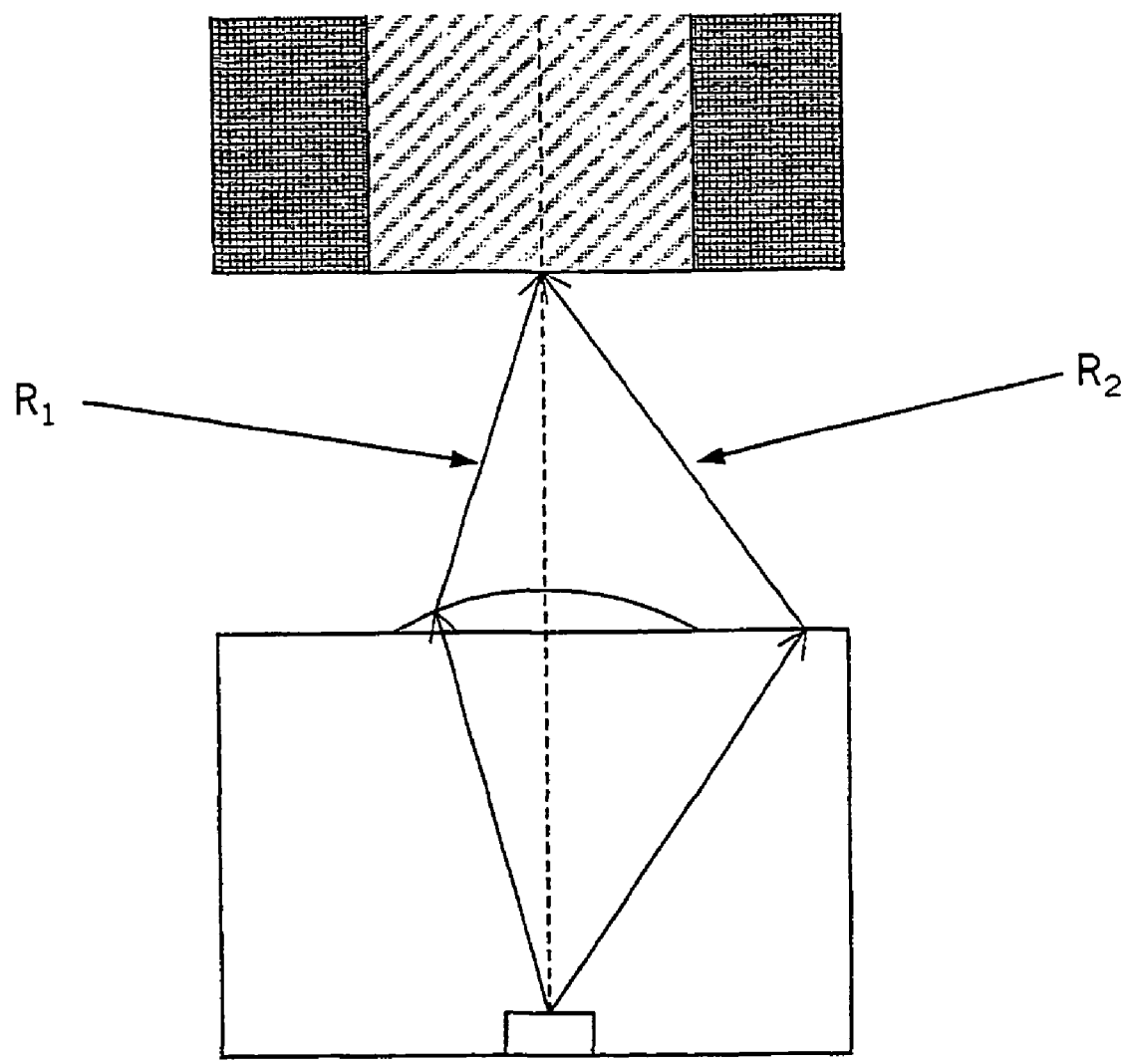

In principle, the lens of FIG. 1 can be modified by providing a refractive lens in the central area, while a diffractive lens is only used at incidence angles of more than 30 degrees across which the Bragg grating has a high efficiency. FIG. 3 illustrates such a structure; a beam R1 advances by way of the refractive lens and a beam R2 by way of the diffractive surface. The solution makes sense for an RC-LED but not so much for a laser, as the boundary between refractive and diffractive sections causes trouble in a spatially coherent field.

Figure 4:
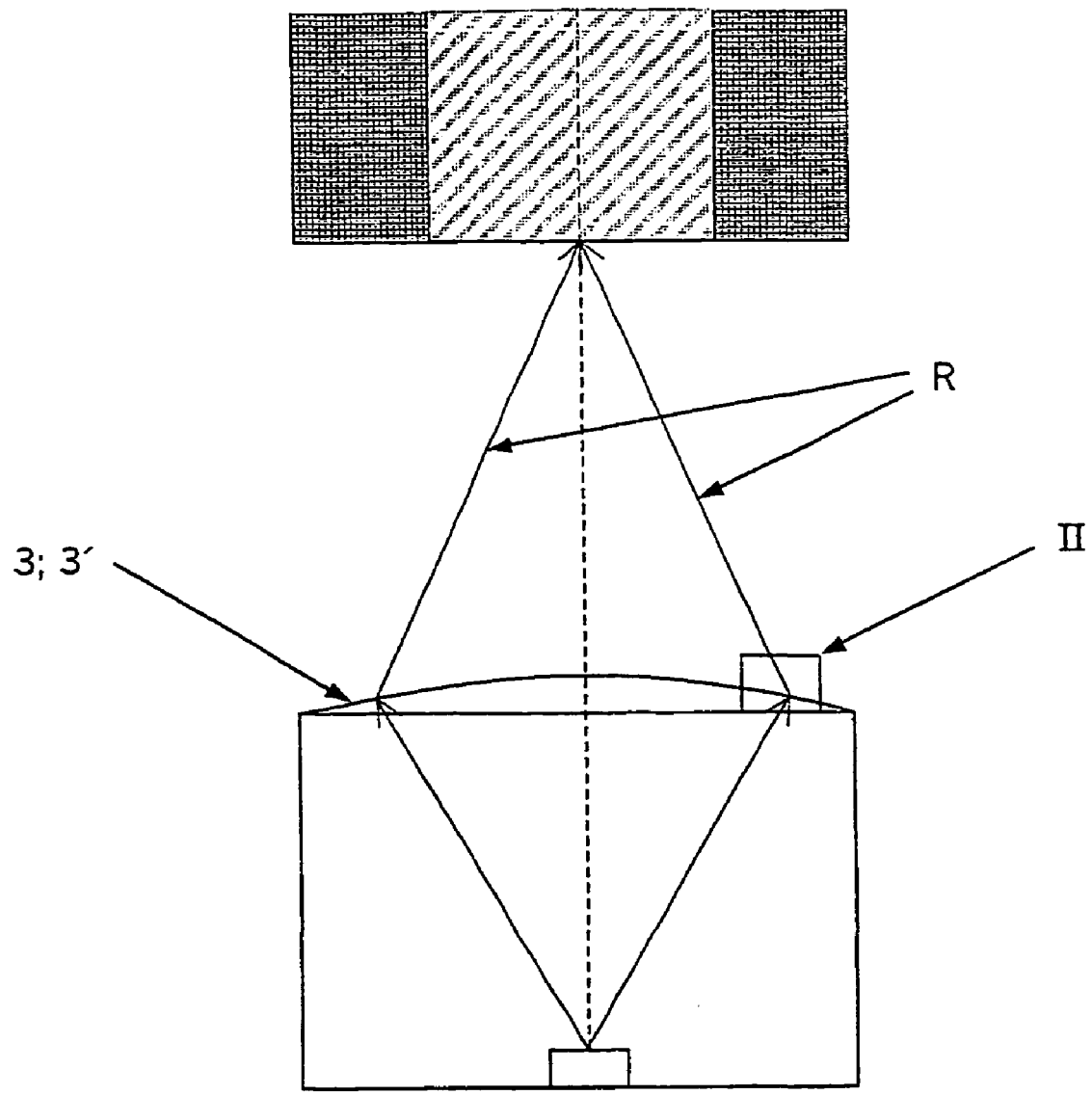

FIG. 4 shows a condition with an imaging geometry considerably different from the imaging geometry of 1:1 (i.e. fiber has been distanced further away from the lens, whereby light can be engaged or connected inside a fiber having a smaller numerical aperture). In this view, the hybrid lens has its refractive surface provided with a diffractive pattern. The reason to employ a hybrid assembly is that the angle $\theta_2$ at II in FIG. 4 is now smaller than in FIG. 1, but the Bragg condition must still be satisfied in order to obtain a high efficiency. This is achieved when the binary structure of FIG. 2 is set on a conveniently curved surface, i.e. the geometry is rotated in such a way that the peaks of Bragg grating have vertical walls thereof locally perpendicular or orthogonal to the curved surface. The optimal surface contour can be calculated and the result is a nearly, although not completely spherical surface. After this, it is necessary to determine the local period of a lens as a spatial function, which can also be worked out on the basis of what has been described above. The surface curvature is quite insignificant in comparison with the use of a purely refractive surface, which means that Fresnel losses are also markedly reduced. Also in this instance, it is possible to provide the central area of a lens with a purely refractive solution, as depicted in FIG. 3.

Figure 5:
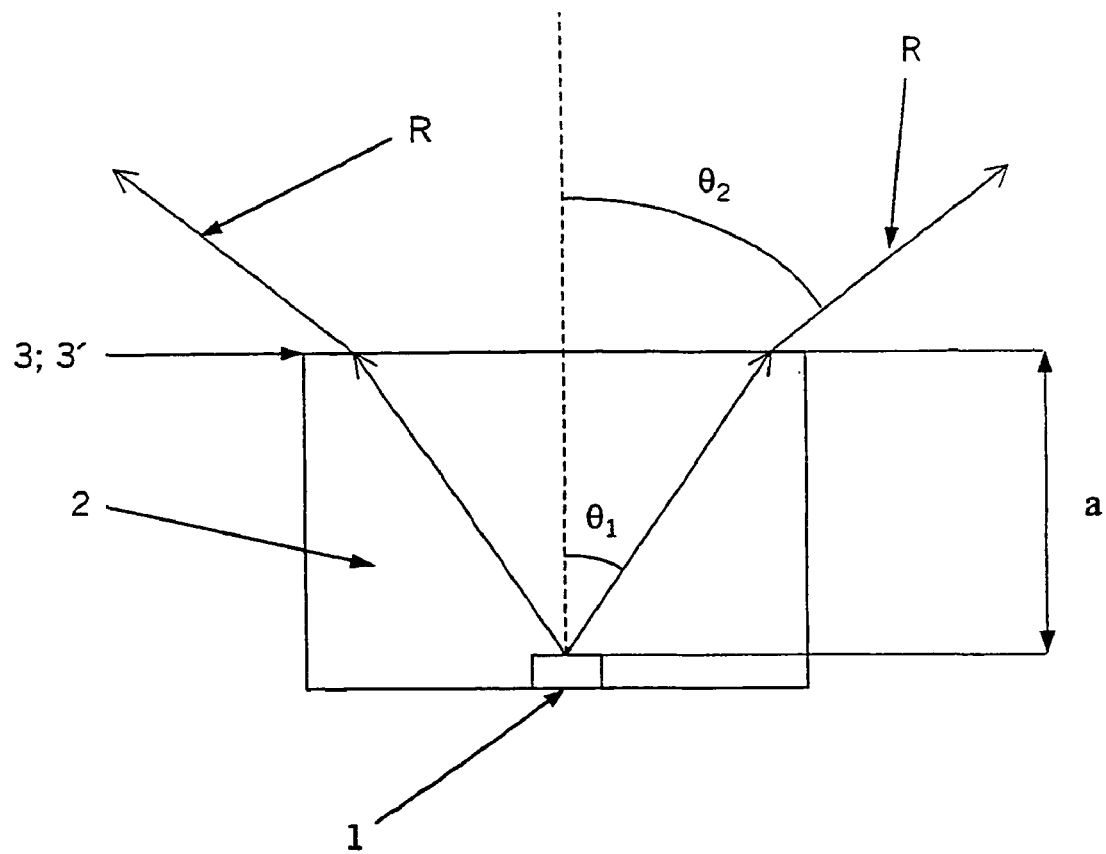
Figure 6:
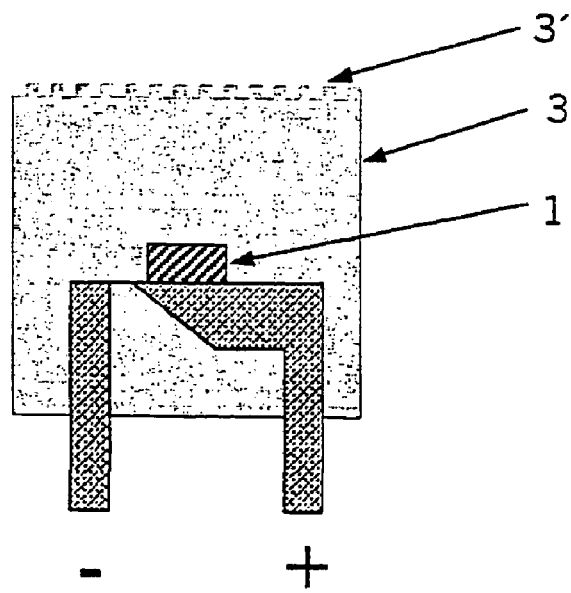
Figure 7:
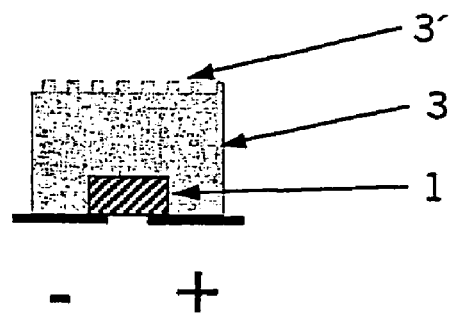
Figure 8:
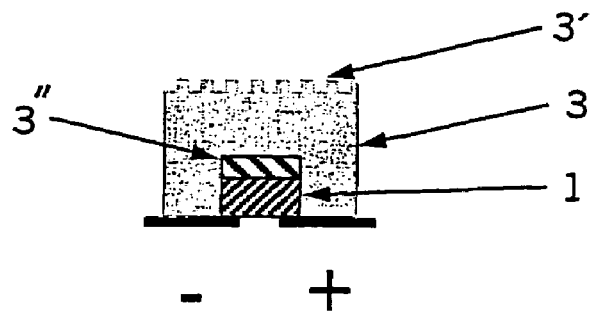

FIG. 5 illustrates a situation, wherein a lens system 3 diverges light beams (i.e. the incidence angle of a beam on the lens system is smaller than its angle of departure).

On the other hand, it is the endeavor with a beam shaper of the invention to submit a radiation field produced especially by an optical semiconductor component, such as e.g. an RC-LED or a VCSEL 1, to collimation, shape forming in a far field, and feeding e.g. into an optical fiber by means of a diffractive or hybrid element. This type of element is e.g. castable directly around or on top of an RC-LED or a VCSEL so as to enclose the discussed element hermetically at the same time.

The following deals with a further specified analysis regarding the basic foundations of the invention. In a first approximation (which is probably sufficient for industrial applications as such), the following hypothesis can be made on the basis of coherence theory:

1. The active region located between a light source and a Bragg structure is infinitely thin and, hence, can be regarded as a planar or flat source.
2. Every dot in the active region functions as a source for a totally coherent Bessel-Gauss beam (i.e. the beam produced by a VCSEL with an identical pattern).
3. The source can be assumed as globally incoherent (quasi-homogeneous), whereby the coherent Bessel-Gauss beams emitted from its various points interfere in an almost destructive manner.

On the basis of these hypotheses it is conceivable to work out a theory regarding the propagation of partially coherent radiation fields produced by an optical semiconductor component, which in turn enables the optimal designing of optical elements on the basis of a hypothesis that a radiation field is approximately a partially coherent conical wave.

Provided that the radiating field of an optical semiconductor component can be modeled by a partially coherent Bessel-Gauss field, it is quite easy to design diffractive elements fabricated for a flat surface, whereby these fields can be collimated, the farfield diffraction distributions thereof can be conditioned for achieving a desired intensity distribution, or the optical power thereof can be guided e.g. into an optical fiber. The exact spatial coherence properties of a source are not likely to have any major effect on the creation of a theoretical model.

First examined is the connection of light from a light source to an optical multi-mode fiber, a good example of such comprising plastic fibers.

If the radiation field of a light source has a numerical aperture which is smaller than or equal in size to the numerical aperture of a fiber and the emitting region of a light source has a diameter which is smaller than or equal to the diameter of a fiber core, the connection of light to the fiber is as simple as can be. The use of a 1:1 imaging lens will be sufficient. Such a lens can be implemented diffractively on a flat surface (i.e. on the top surface of a cylindrical matrix cast around the light source) e.g. as follows: the lens comprises in its central part a conventional micro-Fresnel lens, i.e. its profile is continuous. At large incidence angles, across which the optical output power of a light source is at its highest, the diffraction efficiency of this type of lens is poor even theoretically and the available fabrication technology does not even enable the attainment of theoretical limits. On the other hand, the invention enables the use of binary structures or patterns, which have an excellent efficiency (as high as 97-98%) at the Bragg incidence angle and the fabrication or manufacture of which is also possible with modern technology even though the local grating period is in the same order as the wavelength of light. The lens is fabricable in a standard fashion with electron beam lithography on a resist, followed by making a nickel shim which can be used in a casting mould.

If the image geometry is other than 1:1, the situation will be a little more complicated. This is the case when the numerical aperture of a fiber is smaller than that of the radiation field of a light source, and especially when the beam is to be collimated instead of being connected to the fiber. In this occasion, the fulfillment of the Bragg condition (which is a precondition for a high efficiency in a binary lens) necessitates the bending or deflection of a surface, upon which the diffractive pattern is present. Thus, the diffractive pattern is fabricated on an aspheric, refractive surface, i.e. the question is about a hybrid structure (which is nonetheless implemented for totally different reasons than in the currently available solutions). According to present knowledge, the surface curvature is quite insignificant in comparison with the curvature of a purely refractive surface, whereby the fabrication of a diffractive pattern is implementable e.g. as follows: fabricating first a master element on a resist, then manufacturing a silicone shim which is flexible along an aspheric surface produced by diamond turning (even the use of a spherical surface may suffice for industrial applications), whereafter the structure is reproducible e.g. as a nickel shim suitable for use in a casting mould.

Thus, the above technique is applicable whenever the image side has a numerical aperture which is larger (or smaller) than that of the object side. Another limitation to be remembered with regard to a fiber connection is that the particular light source is a substantially incoherent source and, thus, an image of its active region must fit within the diameter of the fiber core. Hence, the magnification required in imaging may not be arbitrarily large-scale. The same technology applies also to the collimation of light, in which case the radius of curvature of a surface reaches its maximum value.

On the other hand, if it is desirable to fashion or shape a collimated beam in terms of its far-field diffraction pattern e.g. for providing a rectangularly flat top, this can also be implemented in a basically simple manner, e.g. by altering the local period of a diffractive pattern as a spatial function for a controlled supply of aberration to the field.

In reference to the foregoing and in a preferred application of the invention, a beam shaper, which has its transmission element 3 for guiding light beams provided with an imaging geometry of 1:1, is provided with a surface profile 3' which is arranged on a flat surface diffractively in such a way that the guidance of a light beam/beams R, which has/have an incidence angle of more than 5°-30°, preferably 15°, is implemented by means of a diffractive Bragg grating pattern.

In a further preferred application, a beam shaper, wherein a transmission element 3 for guiding light beams is provided with an imaging geometry slightly different from the ratio 1:1, has its surface profile 3' arranged in a hybrid pattern in such a way that the guidance of a light beam/beams R, which has/have an incidence angle of less than 15°-40°, preferably 30°, is implemented by means of a refractive lens, and that of a light beam/beams R, which has/have an incidence angle of more than 15°-40°, preferably 30°, respectively by means of a diffractive Bragg grating pattern.

In another preferred application, a beam shaper, wherein a transmission element 3 for guiding light beam/beams R is provided with an imaging geometry substantially different from the ratio 1:1, has its surface profile 3' arranged in a hybrid pattern in such a way that a diffractive Bragg grating pattern is established on an aspheric or spherical refractive surface for satisfying the Bragg condition and for attaining a high diffraction efficiency.

In yet another preferred application, a beam shaper is integrated with a quasi-monochromatic light source. In this case, the beam shaper is arranged directly on the surface of a light source 1 and/or around the latter in an integral structure, e.g. on principles depicted in FIGS. 6-8, so as to constitute at the same time a protection matrix enclosing the light source 1 at least partially.

Figure 9:
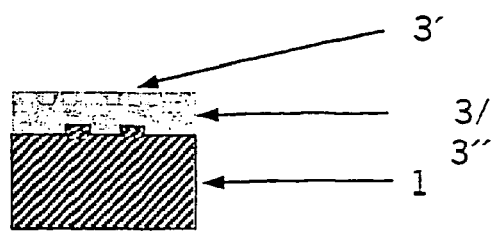
Figure 10:
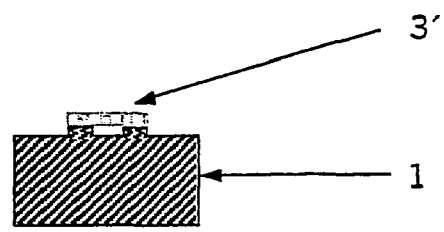
Figure 11:
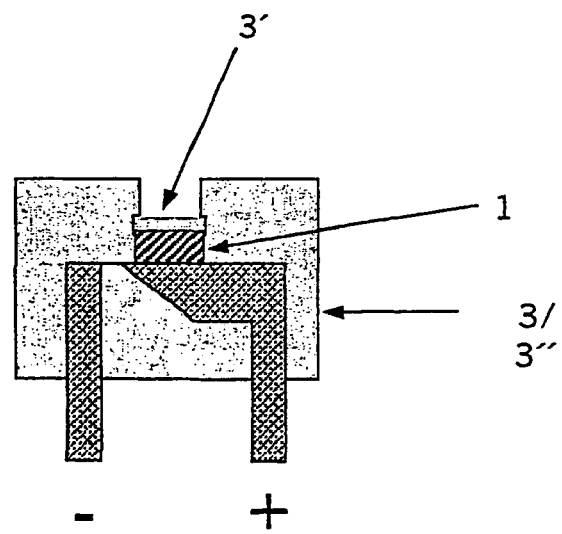

In still another preferred application, a beam shaper is integrated with a quasi-monochromatic light source in an alternative way such that it is arranged by way of mechanical attachment and/or chemical bonding, such as an optically bright nanomer type fixer and/or the like, in contact with a light source 1, such as on its surface and/or around the same, as a separate element, such as a thin film, a coating, a lens or the like, so as to constitute a protection matrix enclosing the light source 1 at least partially, e.g. on principles depicted in FIGS. 9-11.

In a still further preferred application, a beam shaper, integrated with a quasi-monochromatic light source, is intended particularly for shaping the radiation fields and intensity distributions of one or more individual light sources 1, such as a LED, an organic led, a resonance cavity LED (RC-LED), a vertical cavity laser (VCSEL), some other semiconductor diode and/or laser and/or the like. Another light source to be considered comprises optical fibers (e.g. communication networks), whose connector/cross-sectional interfaces can be provided with a beam shaper of the invention as a separate element or in an integral structure.

Figure 12:
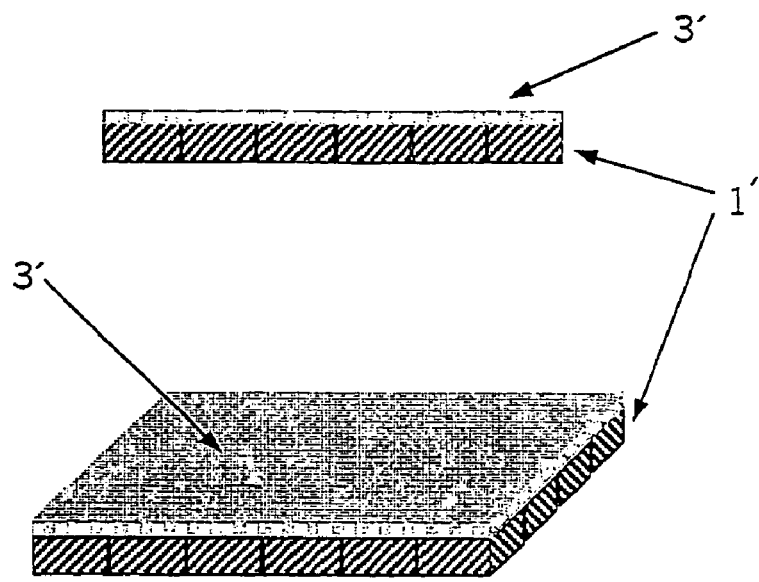

On the other hand, in one alternative solution, a beam shaper is particularly intended for shaping the radiation fields and intensity distributions of two or more light sources 1 or e.g. a light source matrix 1' shown in FIG. 12, such as a LED and laser matrix and/or the like.

In a preferred embodiment, the beam shaper is fabricated from an optically essentially clear material, such as nanomer, polymer, elastomer, a ceramic and/or the like material, which functions as an insulating, electrically non-conductive composition 3, having its viscosity optimized to comply with the requirements of an applied manufacturing process.

In another alternative solution, the beam shaper is fabricated from one or more optically essentially clear materials, such as nanomer, polymer, elastomer or the like, for a composition 3" which is at least partially electrically and/or thermally conductive for providing various additional qualities, such as for enhancing the current density/optical intensity of a light source 1, for the diffraction of a light beam, for heating an element, and/or for the like application.

In yet another preferred application, the mass production of a beam shaper, such as injection moulding, reaction injection moulding, casting, hot embossing, spraying, coating, silk screen printing and/or the like, is implemented by using a flat and/or polygonal or multiform printing block and/or insert, which is modeled by means of an electron beam, a laser beam printer and/or the like to provide a modeled surface profile 3' which is replicated in contact with an article to be manufactured.

It is obvious that the invention is not limited to the embodiments disclosed or described above, but it can be modified in a variety of ways within the fundamental concept of the invention. In addition, structural solutions of the invention can be utilized e.g. in the following:

pulse sources/transmitters for short-and medium-range communication networks (e.g. RC-LEDs, VCSELs)
alarm and signal sources/transmitters (e.g. LED flashlights)
informative sources/transmitters (e.g. guide signs)
light sources/transmitters (e.g. LED/laser lamps)
light source matrices (e.g. LED displays)
optoelectronic components (e.g. integrated CCD cells).

The invention claimed is:

1. A beam shaper for use in connection with a quasi-monochromatic light source, the beam shaper comprising:
a transmission element comprising a substantially transparent material, the transmission element being operative to guide propagation of light from the light source with differing ratios of imaging geometry, the transmission element comprising at least in part binary, surface relief diffractive patterns, having local grating periods optimized with respect to longitudinal and transverse directions, and with respect to an optical axis, wherein the local grating period are optimized substantially in accordance with the Bragg diffraction geometry for providing a maximum diffraction efficiency in guiding the propagation of light, wherein guiding the propagation of light comprises at least one of rounding, making elliptical, collimating, diverging or converging, wherein the beam shaper is integrated with the quasi-monochromatic light source, and wherein the beam shaper is arranged directly on and/or around a surface of the light source in an integral structure so as to constitute a protection matrix at least partially enclosing the light source, and wherein
the transmission element for guiding light beams has an imaging geometry of 1:1 and the beam shaper has a surface profile diffractively arranged on a flat surface such that guiding propagation of the light that has an incidence angle of more than 50°-30° is implemented at least partially by means of a diffractive Bragg grating pattern,
the transmission element has an imaging geometry slightly different from a ratio 1:1 and further comprises a refractive lens and the beam shaper has a surface profile arranged in a hybrid pattern such that guidance of the light that has an incidence angle of less than 15°-40°is implemented by the refractive lens, and, guidance of light that has an incidence angle of more than 15°-40° is implemented at least partially by means of a diffractive Bragg grating pattern, or
the transmission element has an imaging geometry substantially different from a ratio 1:1 and further comprises an aspherical or spherical refractive surface comprising a diffractive Bragg grating pattern operative to satisfy the Bragg condition and attain a high diffraction efficiency, wherein surface relief diffractive pattern of the transmission element is arranged in a hybrid pattern.

2. The beam shaper according to claim 1, wherein the light has an incidence angle of 15° when the imaging geometry of the transmission element is 1:1.

3. The beam shaper according to claim 1, wherein guidance of the light that has an incidence angle of less than 30° is implemented by the refractive lens, and guidance of light that has an incidence angle of more than 30° is implemented at least partially by means of the diffractive Bragg grating pattern when the imaging geometry is slightly different from a ratio of 1:1.

4. The beam shaper according to claim 1, wherein the beam shaper is integrated with the quasi-monochromatic light source, the beam shaper further comprising:
at least one of mechanical attachment or chemical bonding to interconnect the beam shaper and the quasi-monochromatic light source, such that the beam shaper constitutes a protection matrix at least partially enclosing the light source.

5. The beam shaper according to claim 4, wherein mechanical attachment and/or chemical bonding comprises an optically clear nanomer type fixer.

6. The beam shaper according to claim 4, wherein the at least one of mechanical attachment or chemical bonding comprises a separate element constituting a protection matrix at least partially enclosing the light source.

7. The beam shaper according to claim 6, wherein the separate element comprises a thin film, a coating, or a lens.

8. The beam shaper according to claim 1, wherein the beam shaper is integrated with the quasi-monochromatic light source, wherein the beam shaper is operative to shape radiation fields and intensity distributions of one or more individual light sources.

9. The beam shaper according to claim 8, wherein the quasi-monochromatic light source comprises at least one of a LED, an organic LED, a resonance cavity LED, a vertical cavity laser, a semiconductor diode or a laser.

10. The beam shaper according to claim 8, wherein the beam shaper is operative to shape radiation fields and intensity distributions of two or more light sources or a light source matrix.

11. The beam shaper according to claim 10, wherein the light source matrix comprises a LED and laser matrix.

12. The beam shaper according to claim 1, wherein the beam shaper comprises an essentially optically clear material, that functions as an insulating, electrically non-conductive composition, having its viscosity optimized to comply with the requirements of an applied manufacturing process.

13. The beam shaper according to claim 1, wherein the essentially optically clear material comprises at least one of nanomer, polymer, elastomer, or a ceramic material.

14. The beam shaper according to claim 1, wherein the beam shaper comprises at least one essentially optically bright material, at least partially electrically and/or thermally conductive material.

15. The beam shaper according to claim 14, wherein the at least one essentially optically bright material comprises at least one of nanomer, polymer, or elastomer.

16. The beam shaper according to claim 14, wherein the at least one essentially optically bright material is operative to enhance a current density/optical intensity of the light source, to diffract a light beam, or to heat an element.

17. The beam shaper according to claim 1, wherein the quasi-monochromatic light source comprises at least one of a LED, an organic LED, a resonance cavity LED, a vertical cavity laser, a semiconductor diode or a laser.

* * * * *